US012626504B2

(12) United States Patent
Khallaghi

(10) Patent No.: US 12,626,504 B2
(45) Date of Patent: May 12, 2026

(54) MACHINE LEARNING MODEL FOR MEASURING PERFORATIONS IN A TUBULAR

(71) Applicant: DarkVision Technologies Inc., North Vancouver (CA)

(72) Inventor: Siavash Khallaghi, Vancouver (CA)

(73) Assignee: DarkVision Technologies Inc.

( * ) Notice: Subject to any disclaimer, the term of this patent is extended or adjusted under 35 U.S.C. 154(b) by 552 days.

(21) Appl. No.: 17/830,334

(22) Filed: Jun. 2, 2022

(65) Prior Publication Data

US 2022/0415040 A1 Dec. 29, 2022

(30) Foreign Application Priority Data

Jun. 24, 2021 (GB) ...................................... 2109043

(51) Int. Cl.
| | |
|---|---|
| *G06K 9/00* | (2022.01) |
| *G06T 7/136* | (2017.01) |
| *G06T 7/143* | (2017.01) |
| *G06T 7/62* | (2017.01) |
| *G06V 20/10* | (2022.01) |

(52) U.S. Cl.
CPC .............. *G06V 20/10* (2022.01); *G06T 7/136* (2017.01); *G06T 7/143* (2017.01); *G06T 7/62* (2017.01); *G06T 2207/10132* (2013.01); *G06T 2207/30181* (2013.01)

(58) Field of Classification Search
CPC . G06T 2207/10132; G06T 2207/10136; G06T 7/136; G06T 7/62
See application file for complete search history.

(56) References Cited

U.S. PATENT DOCUMENTS

| | | | |
|---|---|---|---|
| 2020/0116880 A1 | 4/2020 | Manders et al. | |
| 2020/0380711 A1* | 12/2020 | Luo ......................... | G06T 7/344 |
| 2021/0199000 A1 | 7/2021 | Chang et al. | |
| 2023/0084403 A1* | 3/2023 | Kaul ...................... | G06N 3/088 |
| | | | 703/10 |

FOREIGN PATENT DOCUMENTS

| | | | | |
|---|---|---|---|---|
| CN | 112581456 A | * | 3/2021 | ............. E21B 47/00 |

OTHER PUBLICATIONS

Dias, L. O., Bom, C. R., Faria, E. L., Valentín, M. B., Correia, M. D., de Albuquerque, M. P., . . . & Coelho, J. M. . Automatic detection of fractures and breakouts patterns in acoustic borehole image logs using fast-region convolutional neural networks. Journal of Petroleum Science and Engineering (Year: 2020).*

(Continued)

*Primary Examiner* — Molly Wilburn
*Assistant Examiner* — Aidan Keup

(57) ABSTRACT

A method and instruction memory for processing acoustic images of a downhole casing to determine perforations of the tubular. The images may be acquired by an acoustic logging tool deployed into cased well. A Machine Learning model is trained to recognize regions of the acoustic images that are perforations or not, in order to calculate geometric properties of the perforation and overall casing. Renderings of the imaged casing may be overlaid with contours and properties of perforations to improve perforation, fracturing and producing operations.

20 Claims, 10 Drawing Sheets

(56) References Cited

OTHER PUBLICATIONS

Taibi, F., Akbarizadeh, G., & Farshidi, E. (2019). Robust reservoir rock fracture recognition based on a new sparse feature learning and data training method. Multidimensional Systems and Signal Processing, 30, 2113-2146. (Year: 2019).*
Combined Search and and Examination Report received for GB Application No. 2109043.6, mailed on Dec. 21, 2021, 7 pages.

\* cited by examiner 23  24  Fig. 5A

3

2

MACHINE LEARNING MODEL FOR MEASURING PERFORATIONS IN A TUBULAR

RELATED APPLICATIONS

This application claims priority to GB Application No. 2109043.6, filed on Jun. 24, 2021, which is incorporated herein by reference in its entirety.

FIELD OF THE INVENTION

The invention relates generally to inspection of fluid-carrying tubulars, in particular using acoustic images and machine learning to identify perforations in downhole casings.

BACKGROUND OF THE INVENTION

Acoustic imaging is used to log tubulars, such as pipelines and wellbores. These images are manually inspected to identify conditions and damage in the tubular. In particular, cracks, corrosion, perforations, and bursts are of interest to operators. Reflections from these features are subtly different from the surrounding area. The existence and size of some of these features can lead to fluids leaking to the environment, so they must be regularly inspected and reported.

Manual inspection is incredibly time-consuming task, as it involves viewing complex, noisy 3D images over many kilometers of pipe or casing. For each candidate feature, the operator may count, locate, or infer certain measurements. They may use digital calipers via the user-interface to estimate a diameter or area of the feature. This process is also prone to error due to judgment of the operator and from one operator to another.

In many cases, the features are hard for human and image processing software to identify because the images are not camera images and not visually clear to people or usable with existing image software.

SUMMARY OF THE INVENTION

In accordance with a first aspect of the invention there is provided a method of identifying perforations in a downhole casing from ultrasound images. The method comprises: receiving an ultrasound image of the casing; determining sub-regions of the ultrasound image that each include one perforation; convolving each sub-region with a Perforation Segmentation Model to create a perforation mask that corresponds to pixels and their probability of being a perforation within that sub-region; calculating one or more geometric properties of each perforation from each perforation mask; and storing the one or more geometric properties in a datastore.

In accordance with a second aspect of the invention there is provided a system for processing ultrasound images of a downhole casing to identify perforations comprising: a memory storing a Perforation Segmentation Model; a datastore storing an ultrasound image of the casing; and a non-transitory computer readable medium. The medium has instructions executable by a processor to perform operations comprising: receiving the ultrasound image of the casing; determining sub-regions of the ultrasound image that each include one perforation; convolving each sub-region with the Perforation Segmentation Model to create a perforation mask that corresponds to pixels and their probability of being a perforation within the selected sub-region; calculating one or more geometric properties of each perforation from each perforation mask; and storing the one or more geometric properties in a datastore.

Aspects may further comprises thresholding the perforation mask to use pixels in the perforation mask above a threshold probability for calculating the one or more geometric properties.

One of the geometric properties may be a contour that encapsulates the perforation, preferably a 2D contour in coordinates of azimuth and axial position along the casing.

Aspects may further comprises a ring-shaped phased-array of ultrasound transducers movable axially through the casing for capturing transverse image frames of the casing.

Aspects may determine the sub-regions manually via a User Interface displaying a 2D image of a portion of the ultrasound image and receiving locations of perforations or boundaries of sub-regions around perforations.

The geometric properties may be a diameter or volume of the perforation.

The ultrasound image may comprises three-dimensional data, preferably provided in polar coordinates.

The Segmentation Model may be a Semantic model, preferably a UNet, UNet++ or Deeplab.

Aspects may assemble a geometric model of the casing from the geometric properties of hundreds of perforations.

Aspects may render a visualization of the casing to a user from the received ultrasound image overlaid with the perforation mask and/or calculated geometric properties from several perforations.

Aspects may comprise a User Interface providing i) a 2D display of a portion of the ultrasound image and ii) input means for tagging the locations of perforations or bounding sub-regions around perforations.

Further aspects of the invention are set out below and in the appended claims. Thus preferred embodiments of the invention enable the device to automatically identify voids in tubulars, such as perforations and cracks, and output geometric measurements of them.

BRIEF DESCRIPTION OF THE DRAWINGS

Various objects, features, and advantages of the invention will be apparent from the following description of embodiments of the invention and illustrated in the accompanying drawings. The drawings are not necessarily to scale, emphasis instead being placed upon illustrating the principles of various embodiments of the invention.

FIG. 5A is a perspective view of a casing having defects and perforations.

DETAILED DESCRIPTION OF THE INVENTION

The present invention may be described by the following preferred embodiments with reference to the attached drawings. Disclosed are a method and system to automatedly identify perforations 3 in casings 2 and provide geometric properties of them from ultrasonic images, using a Machine Learning model 1, in particular a Segmentation Model. The output for each perforation may be a contour, binary mask, diameter, effective diameter, ovality, depth, volume. Advantageously, the metric can be calculated much faster and is not subject to human judgement.

Figure 6:
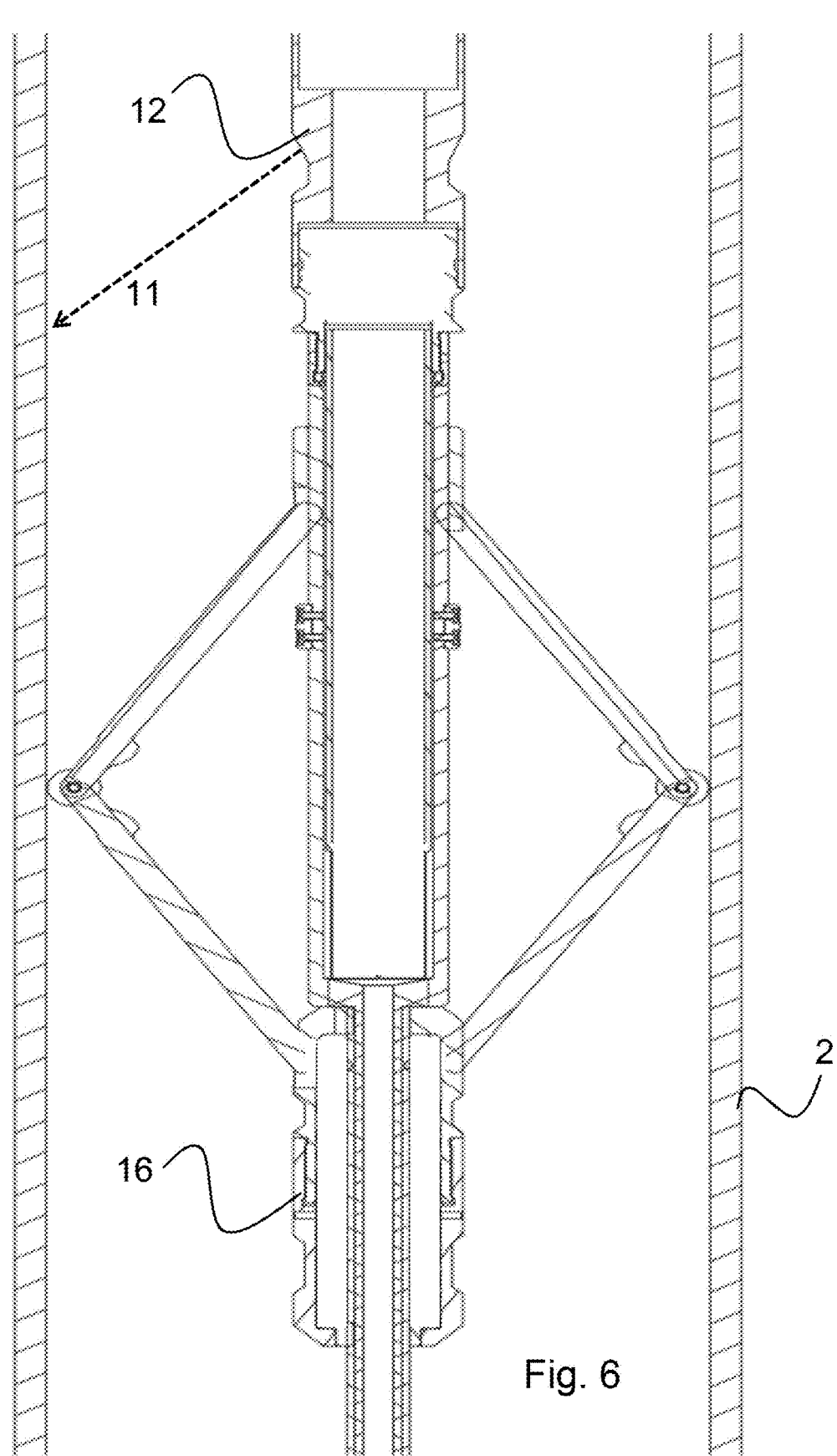
FIG. 6 is a cross-section view of an imaging tool capturing acoustic images in a casing.

As shown in FIG. 6, an imaging tool 16 comprises an array of transducers 12 mounted in an elongate housing and travels axially through the casing. The transducers are preferably a ring-shaped phased array operating in the ultrasound band. The imaging tool is preferably that of the leading technology in this area, exemplified by: US20200116880A1 filed 15 Oct. 2019 and entitled "Overlapped scheduling and sorting for acoustic transducer pulses."

Such an array of ultrasound transducers uses beamforming to capture scanlines 11 data of a downhole casing. Typically, images are captured as transverse frames (in the Θ, R plane) using the whole array, while the tool is conveyed (in the Z axis) through the casing to log a long section of the casing. The result is a 3D ultrasound image with millimeter-level resolution, which may be stored raw and demodulated or compressed into local storage and then transmitted to a remote workstation for offline image processing, as described herein below. Thus, polar coordinates are a native system for such a tool and the image data may be stored in that format.

Figure 8:
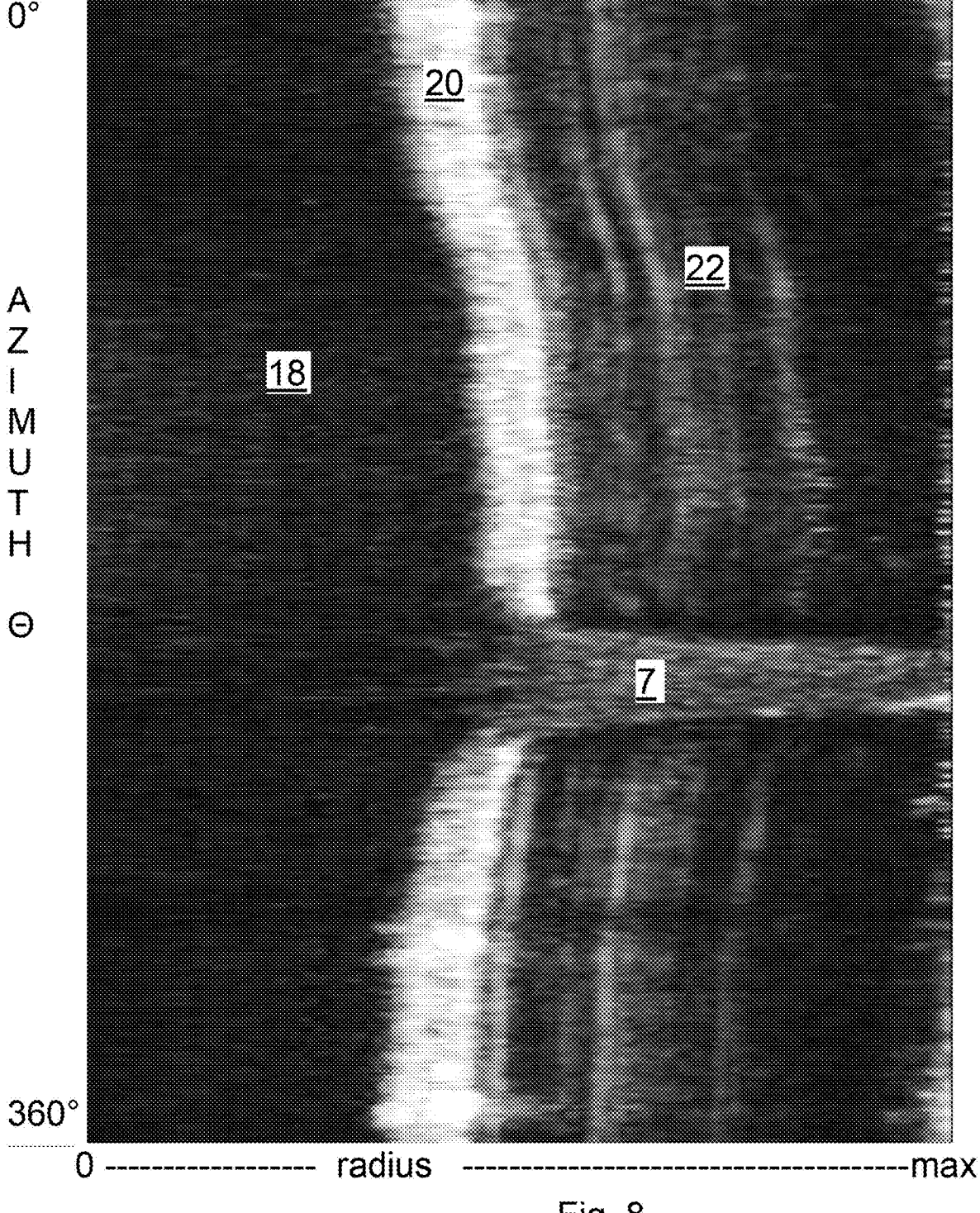
FIG. 8 is an unwrapped acoustic image of a single transverse frame.

An example image frame is shown in FIG. 8, unwrapped, showing scanlines vs reflection sample time, in Θ, R coordinates respectively. Here ultrasound travel time is converted to radial distance. The sinusoidal nature of the surface 20 is due to uncorrected eccentricity of the tool within the casing 2. Other reflections come from particles 18 in the fluid or secondary reflections 22 of the casing 2. Instead of showing no reflection over the perforation, there are diffuse reflections 7 from edges and outflares of the perforation. These appear to travel far radially but actually just take a long time to return to the transducer.

It will be appreciated that other ultrasonic imaging tools, form factors, and shapes may be used to capture the casing and may be stored in alternative coordinate systems. The present system is described in terms of the preferred embodiment of a ring-shaped transducer capturing transverse frames and storing them in polar coordinates.

Machine Learning Model

The processor applies a Machine Learning (ML) model to the ultrasound image. Because wellbore casings are typically several thousand meters long, the ML model is applied to smaller image segments and later recompiled into a rendering of the full casing. For a selected image sub-region, the ML model returns a contour that encompasses the exit hole in the casing. This contour is preferably described in cylindrical coordinates as a tuple of azimuth, radius, and axial depth in the casing. The contour may be simplified assuming a fixed radius and represented as a sequence of points $C=[(\Theta 0, z0), (\Theta 1, z1), \ldots (\Theta n, zn)]$.

Figure 1:
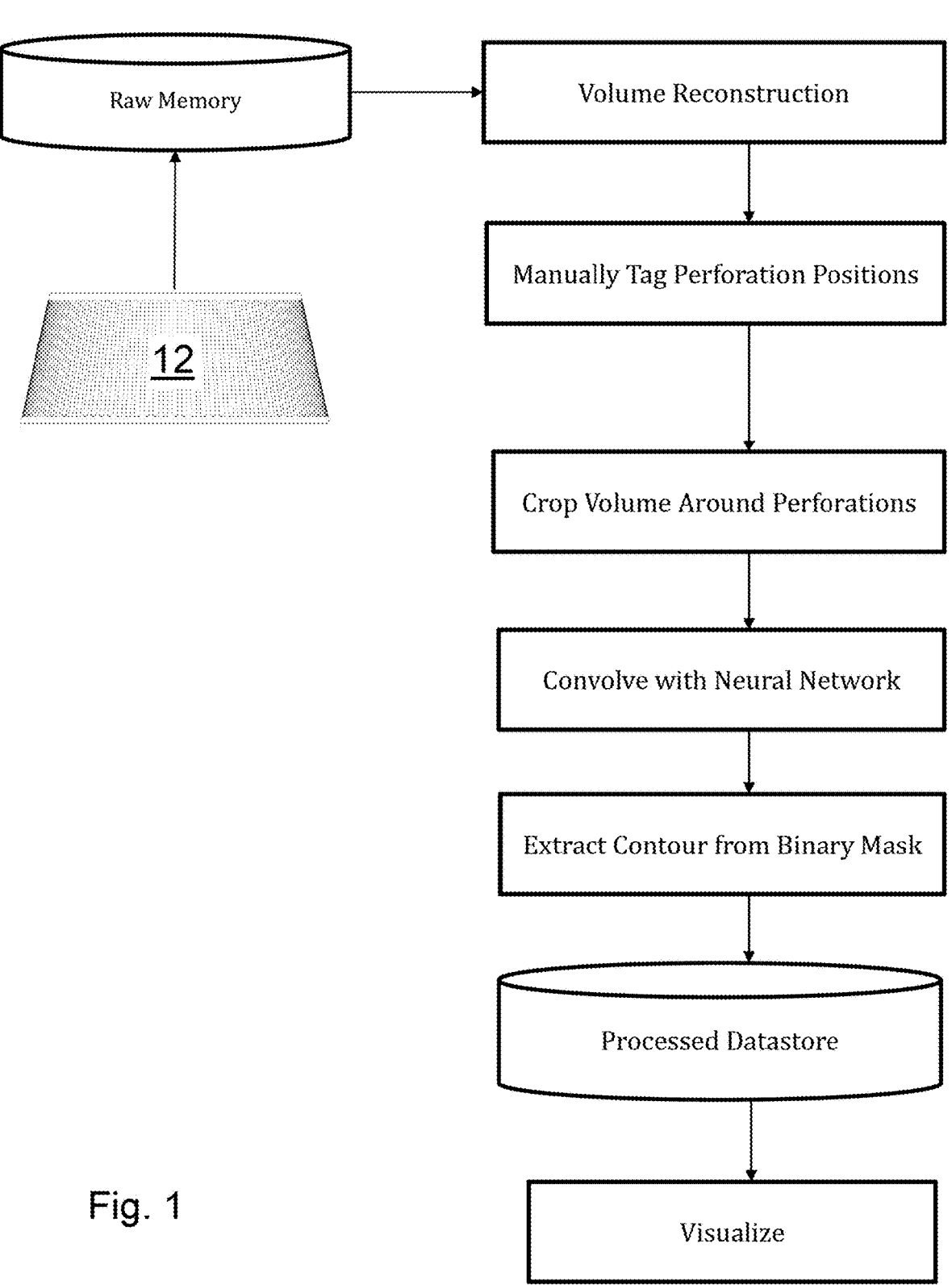
FIG. 1 is a flowchart of a semi-automatic perforation measurement workflow.
Figure 2A:
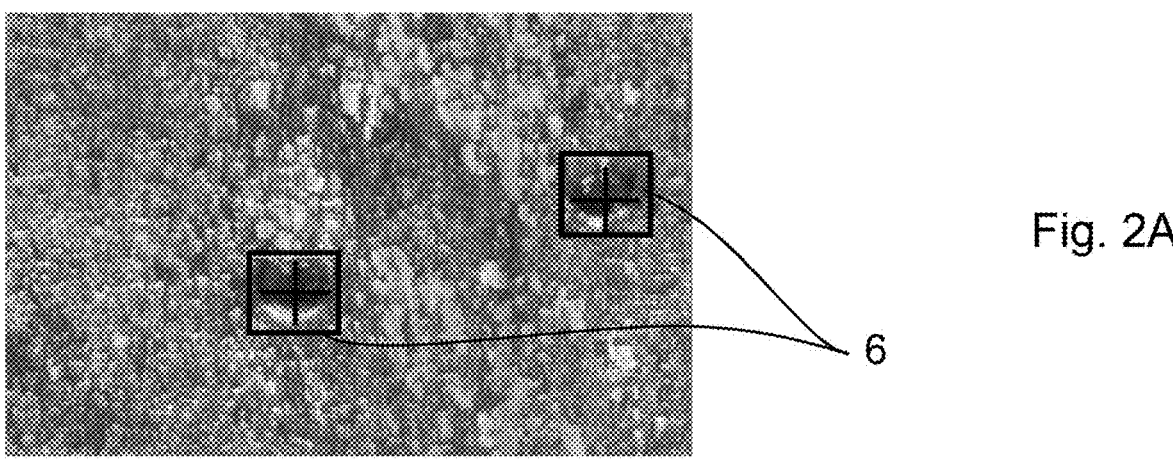
FIG. 2A is an image of manually labelled perforations.
Figure 2B:
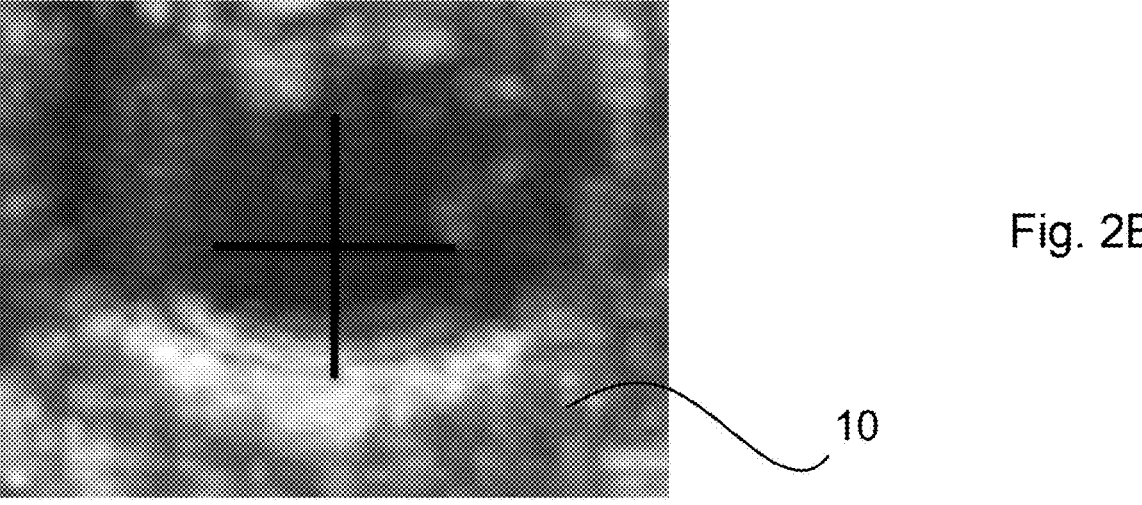
FIG. 2B is a cropped image around a single perforation.
Figure 2C:
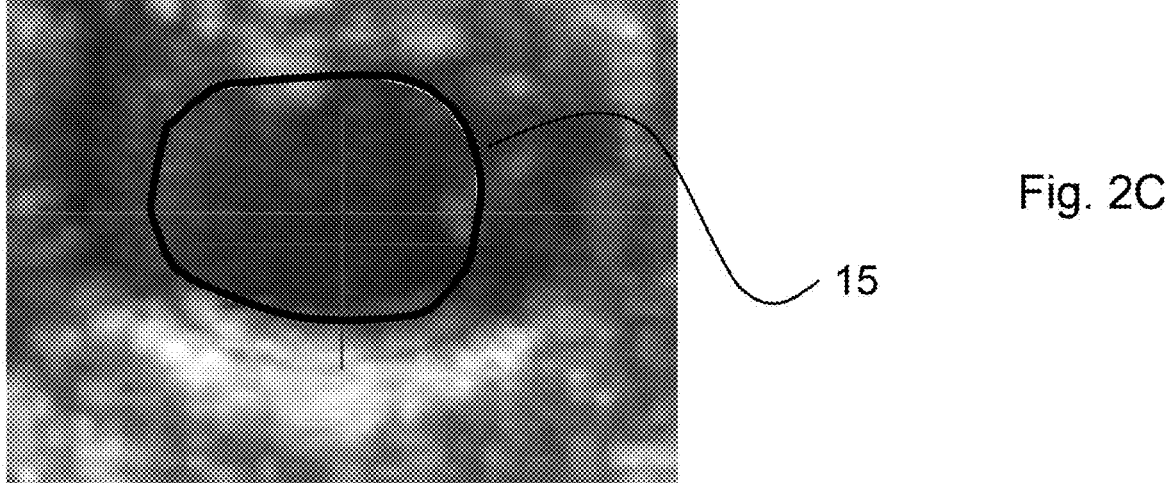
FIG. 2C is an image with an automatically calculated contour.

FIGS. 2A, 2B, 2C illustrate the process of inference using the ML model. In FIG. 2A, a user has tagged the approximate location of two perforation visible on a portion of the overall casing image using input means on a UI, such as clicking a mouse. The tag may be a center point or boundary definition, e.g., bounding box. Then a cropping is made around this approximate center with an exemplary margin of 2 cm in depth and 0.4 radians in the azimuth direction. This volume is resized to 64×32×64 pixels and its intensity values are globally normalized to span 0-1. This generates the input volume 10 shown in FIG. 2B. The output contour 15 from the Perforation Model is shown in FIG. 2C, preferably in the same image dimensions as the input image.

Herein we refer to architecture and machine learning terms that are common in the visual image processing fields for simplicity and clarity. It will be appreciated that modifications may be necessary in the present model to operate on images that are now 3D and represent ultrasound reflections. As used herein a pixel is not a color, but rather a demodulated waveform of a reflection signal. Moreover, an important aspect of an ultrasound image of a perforation is the characteristic way reflections bounce of edges and outflares, in a way one does not directly 'see' in the image visually. These characteristics cannot be described mathematically and are best learned. In fact, some of the characteristic perforation features look like noise to the untrained observer.

The inventors have found that a Convolutional Neural Net (CNN) is desirable because they are largely spatially invariant and computationally efficient, especially when run on a GPU or TPU (tensor processing unit). CNN architectures of the types used in RGB image processing to identify common objects may be used with some modifications to work on ultrasound "pixels" in circular images to identify voids. Modifications to their training are also provided below.

The complete algorithm may comprise several stages: a first stage that determines that an acoustic image contains one perforation, bounded by some box to define a subimage; a second stage that convolves the sub-image with a Perforation Segmentation Model and outputs a mask of the perforation, and a third stage that determines a contour of the perforation based on the mask. At the output of the first stage, the system knows generally where a perforation (probably) exists, but nothing about the geometric qualities of the perforation. This latter knowledge is important to determine the qualities of the perforation operation, effect of fracturing operation, and estimating production through the perforations.

This first stage may be implemented using an object detection model such as YOLO or Faster RCNN. These models process larger images to create bounding boxes that probably contain a perforation within a proposed sub-image.

In another embodiment, manual annotation is used to determine the bounding box which contains the perforation. That is, the system's user interface comprises input means for an operator to identify a centroid pixel and/or bonding box where a perforation is believed to be. The User Interface (display) is typically two dimensional and thus allows the operator to specify coordinates of the centroid or bounding box in two dimensions (i.e., two of: radius, axial depth and azimuth). Via the UI, the operator preferably flags the approximate center of the perforation in terms of azimuth Θ and axial position z. The third dimension, inner to outer radius, may be assumed from the casing geometry and Speed of Sound of the fluid. For example, the system considers received reflections from ±3 cm of the expected distance from transducer to tubular surface. Subsequently a one-size-fits-all bounding box may be used to crop the sub-image for further processing. Compared to typical camera processing, the present imaging tool is in a tubular of known diameter and expected perforation size, so the system can assume a fixed field of view and thus bounding box.

Segmentation is the process of partitioning an image into multiple segments by assigning a label to each pixel. For perforation measurement, the goal of the segmentation model is to process a volumetric image and assign a "PERF" label to all the pixels within the rotation and depth span of the perforation regardless of their radius. A "BACKGROUND" label is assigned to all surrounding pixels that don not fall within the perforation, such as fluid, casing, and formation.

The ML Model 1 may be of the UNet, UNet++ and DeepLab architecture. These architectures use convolutional layers to reduce the number of parameters through weight sharing when generating feature maps. Furthermore, convolutional layers induce translational invariance, which means the segmentation model can label objects even if they are translated across the image.

Figure 3:
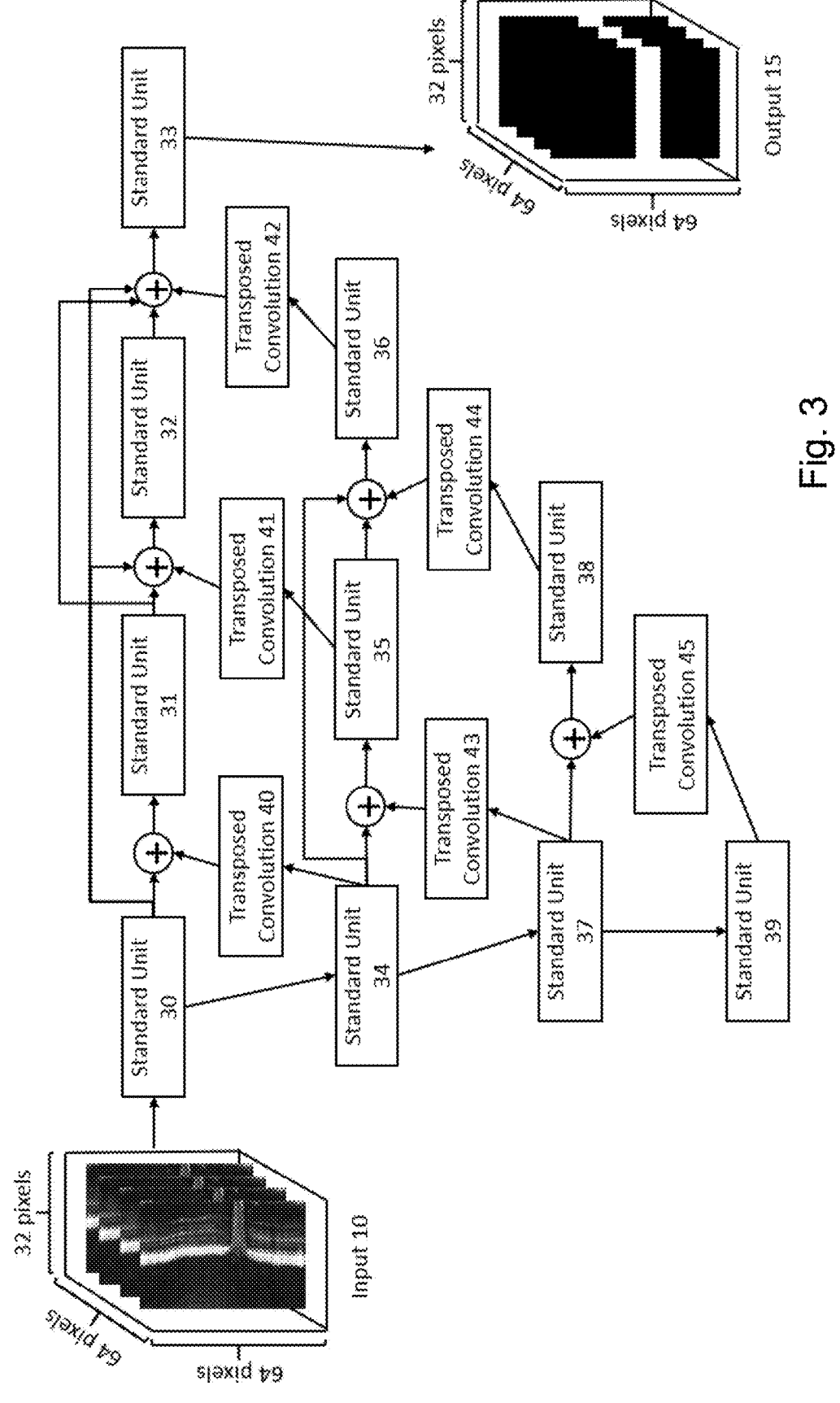
FIG. 3 is a block diagram of the neural network architecture (UNet++).
Figure 4:
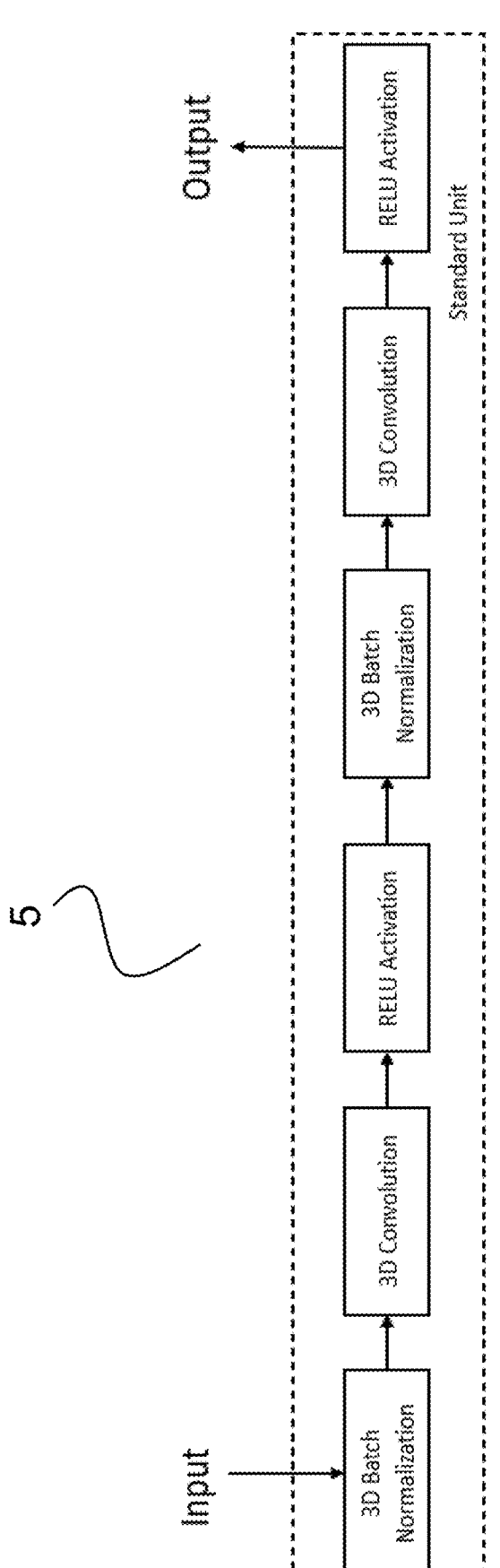
FIG. 4 is a block diagram of a Standard Unit (SU) in a neural network.
Figure 5B:
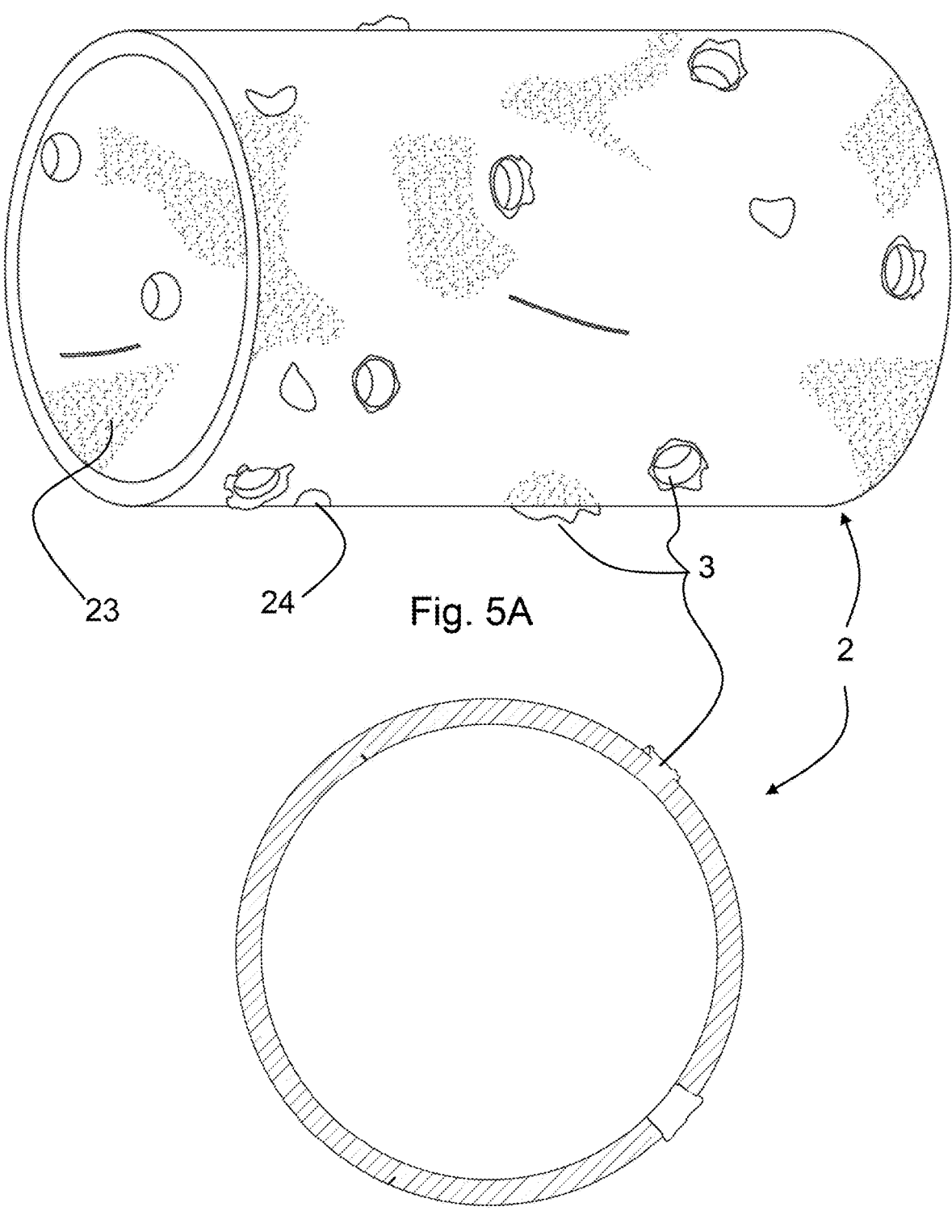
FIG. 5B is a cross-section view of a casing with perforations.

FIG. 3 shows an exemplary embodiment that takes an input image volume 10 and outputs a mask 15. This network employs several layers of convolutional networks, where each layer progressively processes the image at a wider receptive field until a low-resolution bottleneck is reached. This bottleneck captures the global information in the image. From this bottleneck, the model progressively upsamples the global context into the image resolution. The model comprises repeated Standard Units 5, 30-39 and transposed convolution units 40-45.

The model may also include a shortcut processing blocks, that allows information to be passed at the same resolution without having to go through the bottleneck. These shortcut blocks act as gradient highways during training to improve convergence and model generalization.

For activation functions, the encoder architecture uses Rectified Linear Units (ReLU), but other activation function such as Leaky or Randomized ReLUs could also be used to improve the accuracy of the model. The architecture further employs a Batch Normalization layer, which normalizes and scales the input feature maps to each convolutional layer. Batch Normalization layers help in speeding up the training process and reduce the possibility of the model overfitting the training data. Because Batch Normalization helps reduce overfitting, the model does not need Dropout layers.

The UNet++ model progressively processes its input in a downward path to create more abstract representation of its inputs. Upon inspection, the initial layers learn low level features such as gradients and intensity values while deeper layers with larger receptive fields learn higher level features such as the general shape of the perforation.

The upward path of UNet++ uses transposed convolutions to up-sample coarse high-level features into fine representations. Shortcut connections between the downward and upward paths process intermediate features to create rich features that can be further enhanced by subsequent layers. At the top of the upward path, convolutional blocks process an aggregated set of features from all downward and upward paths to label perforation pixels.

Image Coordinate System

In the preferred system, the image data is represented in three main axes: Θ, R and Z (the Z axis is also the logging axis separated in time by frames; R is the radial distance from the transducer array (or major axis of the tool), in directions transverse to the logging axis, measurable in time-sampled pixels or physical distance; and Θ corresponds to the azimuthal angle of a scan line in the transverse plane, i.e., rotation around the casing.

Figure 7:
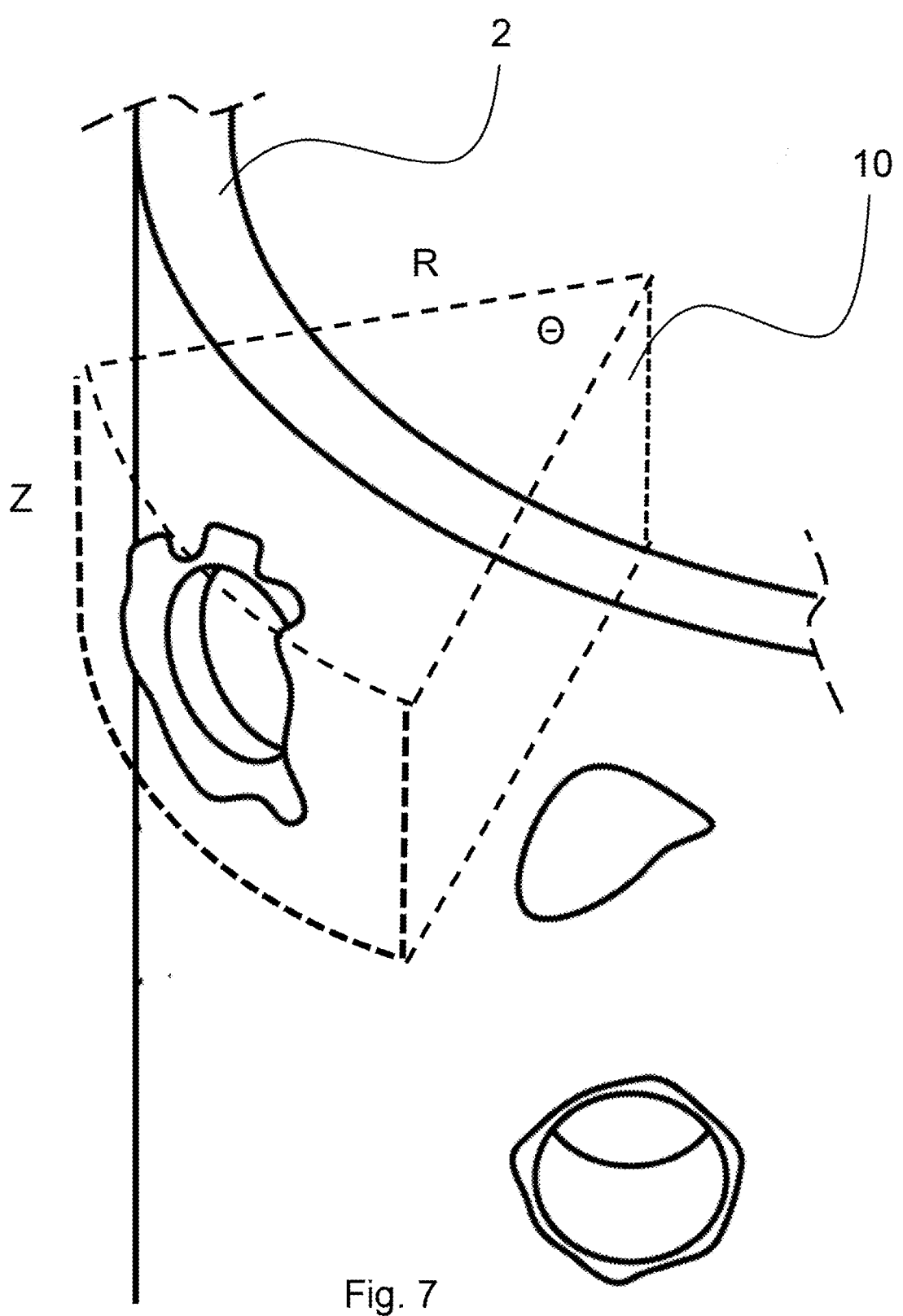
FIG. 7 is an illustration of a sub-region of an image selected around a perforation.

FIG. 7 illustrated a 3D sub-region 10 of the overall image of the casing 2, showing the Θ, R, Z coordinates and the dotted wedge that defines a boundary around the perforation.

As used in FIG. 8, the Θ-R plane represents data collected from a cross-sectional slice of the tubular at a specific axial position (z) that may be displayed in the User Interface. Conversely, FIG. 2A shows the User Interface in the Z-Θ plane, where pixel intensity is shown for a given radius. Either display may be used by the User to input a perforation location or boundary around a perforation.

Input

The image size of the sub-region 10 selected for processing preferably relates (in terms of pixels) to the size of the GPU that can be stored for efficient matrix operations and relates (in terms of physical units) to the size of the apparatus. These are both related by the ultrasound scan resolution (pixels/mm or pixels/radian). In preferred embodiments, a sub-region may be from 50 cm to 2 m axially or may be 200-1000 pixels in either azimuthal or axial dimensions (not necessarily a square).

Given the expected sizes of the casing and perforation, the system can set a sub-region size that should encompass a perforation, without adding too much background area.

Outputs

The output of the Segmentation Model is a volume where pixels have probabilities of being Perforation (vs Background). This probability may span a range between 0 and 1. Alternatively, the output may be multiple classes (Inner, Perforation, Outer). This volume is further processed using a thresholding operation to create a binary mask where each pixel belongs either to a perforation or the casing region. The threshold value may be set to 0.5.

The perforation contour is extracted from the binary mask using a contour fitting algorithm. A suitable contour fitting algorithm snaps a smooth contour to the binary mask and is described by only a few points along the contour. This contour fitting algorithm may use the Teh-Chin chain approximation algorithm as it approximates the contour using dominant points at the mask boundary.

The system maintains a database to store ultrasound images and perforation metadata. For each casing log, the system may store raw images, modified images, bounding boxes of identified perforations, and calculated geometric properties. A processor addresses this data to compute values for the entire casing, sections thereof or render images on a display.

Training

Training volumetric segmentation neural networks to produce robust and accurate models is challenging. The amount of memory required for training a model scales linearly with the number of slices in the volume. As a result, volumetric models are limited in the number and resolution of convolutional blocks. However, small models that act on low resolution volumes lack accuracy when it comes to segmenting images. This poses an intricate balancing problem between the model complexity and its computational requirements.

Furthermore, the accuracy of modern segmentation architectures is highly influenced by a backbone model. In the context of computer vision, a backbone model is a CNN that was previously trained on a large dataset and is then used as a feature extractor. Without a backbone model such as ResNet, MobileNet or their variants, the accuracy of segmentation models degrade drastically. Unfortunately, no such models exist for perforation volumes, which makes training an accurate segmentation model challenging.

Figure 9:
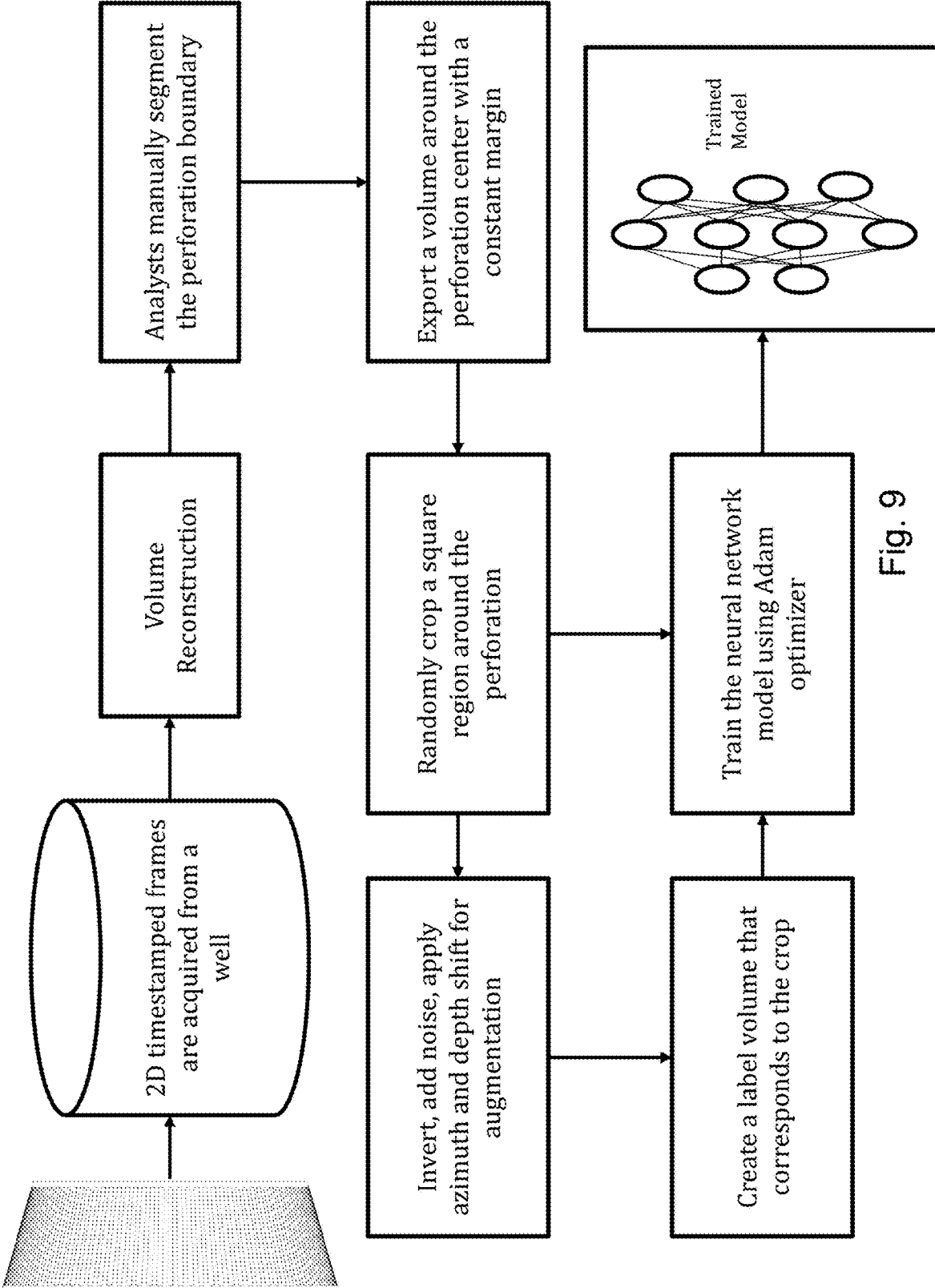
FIG. 9 is a flowchart for training a Segmentation Machine Learning Model.
Figures 10A, 10B, 10C:
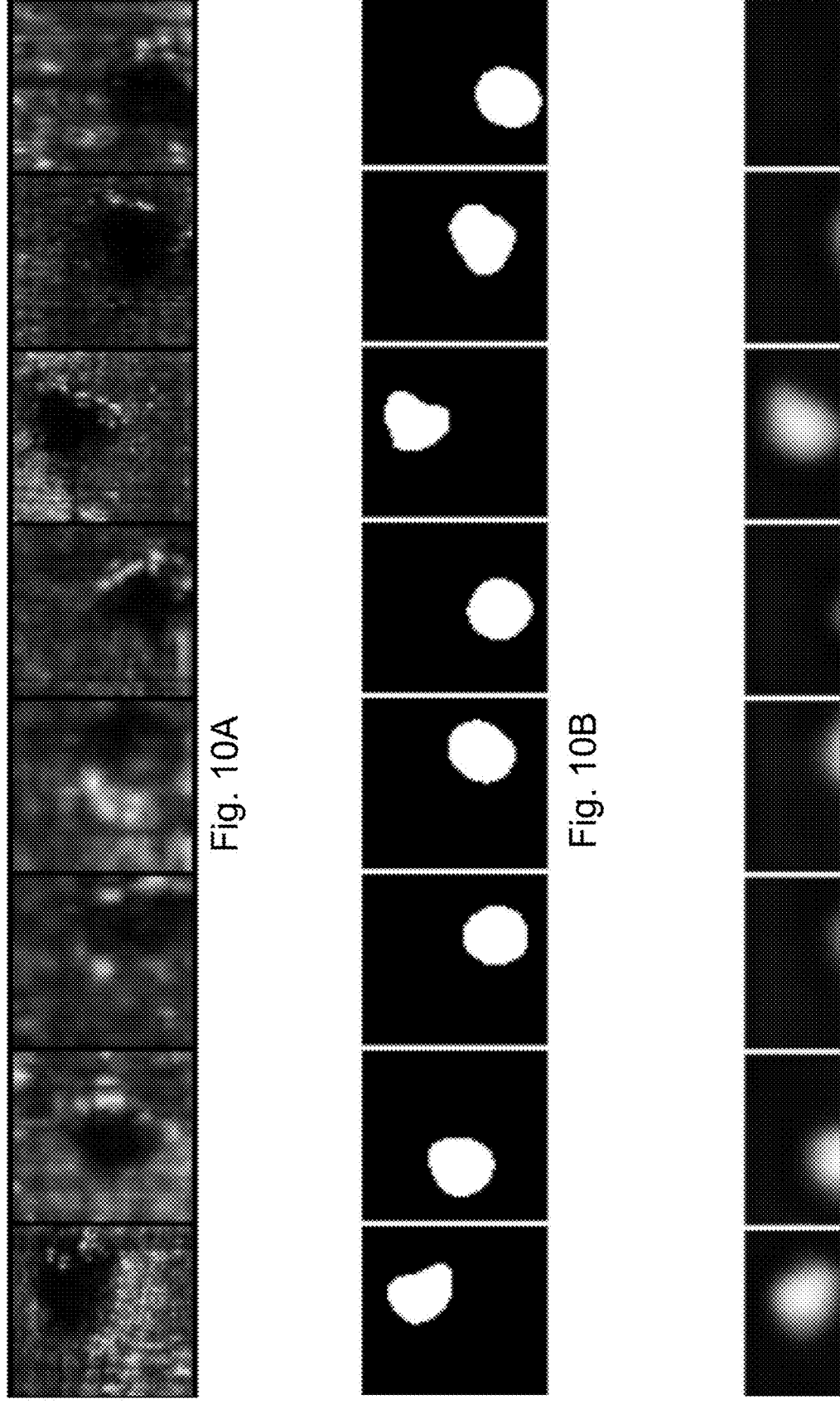
FIG. 10A is a set of training images.
FIG. 10B is a set of corresponding training masks.
FIG. 10C is a set of model predictions given training images.

FIG. 9 illustrates the process for training the model. For each perforation in a well, a 2D image is chosen that spans the full range along the azimuth (theta) and radius (r) axes. Along the Depth dimension (Z), a 5 cm margin around the perforation is used to create the 3D volume. This ensures that all exported perforations are fully contained within the exported volume. During training, a randomly cropped square region in the azimuth and depth directions is created on the exported volume around the perforation. This random cropping is both random in terms of where the center of the crop is with respect to the perforation and also how big this square crop is. Typical lengths of the square crop go from 2 to 5 times the size of the perforation. Since the model takes fixed size input, this volume is resized to 64 (azimuth)×32 (radius)×64 (depth) and is subsequently normalized in intensity.

The system further expands the training dataset of perforations with different orientation angles, intensities, geometry, and sizes. The training set may be generated by data-augmentation of ultrasound images with labelled pixels ('PERF', 'BACKGROUND'). The training set may also comprise augmented images flipped around an axis, changing the brightness and the contrast of the image, without affecting the estimated label.

The architecture may employ an Adam optimizer for training the ML model, as it is easier to tune than a stochastic gradient descent optimizer. A stochastic gradient descent with momentum is also an alternative. A learning rate scheduler may be used to reduce the learning as a function of the current training epoch. The loss function for the optimizer is the binary cross entropy function. In the UNet++ model, these standard-units are followed by pooling layers to decrease the dimensionality of their outputs in a downward path. The successive operation of standard-units and pooling layers gradually decreases the dimensionality of features into a bottleneck, which is a compact representation of the entire image. After the bottleneck, the standard-units are followed by transposed convolution layers to increase the dimensionality of feature maps to the original image size in an upward path.

Geometric Analysis and Rendering

The resulting contour may be further processed to determine an area, diameter, effective diameter, volume, and other geometric properties of the perforation, which are useful is appreciating the effectiveness of fracturing, proppant erosion, and oil production.

The area of a contour and the equivalent circular perforation may be equated, where the area of the contour C=[(Θ0, z0), (Θ1, z1), . . . (Θn, zn)] is:

$$\frac{1}{2}\int_C \Theta dz - z d\Theta$$

The system may then overlay the contours on the larger original image of the casing for display to the operator to confirm or appreciate what has been automatically calculated. Alternatively, the system may replace the original image data with the masked perforation pixels for displaying a void or stylized perforation. The former shows the original image data while the latter more naturally visualizes the perforation. Rendering operations may include filtering, contrasting, and smoothing of the image data. The system may visualize and render the casing to a user on a display 29 using hundreds or thousands of the identified and contoured perforations.

The above method and process may be carried out on a computer processor, which may comprise a CPU/GPU, a datastore for storing the Perforation Model, a datastore for images and perforation metadata, and instructions on a non-transitory computer readable medium.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method of identifying perforations in a downhole casing from ultrasound images, the method comprising:
   receiving an ultrasound image of the casing;
   determining sub-regions of the ultrasound image that each include one perforation;
   convolving corresponding pixels of each sub-region with a Perforation Segmentation Model to create a perforation mask that corresponds to the pixels and their probability of being a perforation within that sub-region expressed as a pixel perforation probability value being a range between a first value indicating a background pixel and a second value indicating a perforation pixel;
   calculating one or more geometric properties of each perforation from each perforation mask;
   storing the one or more geometric properties in a datastore; and
   rendering a visualization of the casing to a user from the received ultrasound image overlaid with at least one of: the perforation mask or calculated geometric properties from several perforations.

2. The method of claim 1, further comprising thresholding the perforation mask to use pixels in the perforation mask above a threshold probability for calculating the one or more geometric properties.

3. The method of claim 1, wherein one of the geometric properties is a contour that encapsulates the perforation, the contour being a 2D contour in coordinates of azimuth and axial position along the casing.

4. The method of claim 1, further comprising imaging the casing using a ring-shaped phased-array of ultrasound transducers moved axially through the casing while capturing transverse image frames of the casing.

5. The method of claim 1, wherein determining the sub-regions is performed manually via a User Interface displaying a 2D image of a portion of the ultrasound image and receiving locations of perforations or boundaries of sub-regions around perforations.

6. The method of claim 1, wherein the geometric properties calculated is a diameter or volume of the perforation.

7. The method of claim 1, wherein the ultrasound image comprises three-dimensional data provided in polar coordinates.

8. The method of claim 1, wherein the Perforation Segmentation Model is a Semantic model corresponding to at least one of a UNet, UNet++, or Deeplab.

9. The method of claim 1, further comprising assembling a geometric model of the casing from the geometric properties of hundreds of perforations.

10. A system for processing ultrasound images of a downhole casing to identify perforations comprising:

a memory storing a Perforation Segmentation Model;

one or more datastores storing an ultrasound image of the casing; and a non-transitory computer readable medium having instructions executable by a processor to perform operations comprising:

receiving the ultrasound image of the casing;

determining sub-regions of the ultrasound image that each include one perforation;

convolving corresponding pixels of each sub-region with the Perforation Segmentation Model to create a perforation mask that corresponds to the pixels and their probability of being a perforation within the selected sub-region expressed as a pixel perforation probability value being a range between a first value indicating a background pixel and a second value indicating a perforation pixel;

calculating one or more geometric properties of each perforation from each perforation mask;

storing the one or more geometric properties in the one or more datastores; and rendering a visualization of the casing to a user from the received ultrasound image overlaid with at least one of: the perforation mask or calculated geometric properties from several perforations.

11. The system of claim 10, further comprising a User Interface providing i) a 2D display of a portion of the ultrasound image and ii) input means for tagging locations of perforations or bounding sub-regions around perforations.

12. The system of claim 10, the instructions further performing thresholding the perforation mask to apply pixels in the mask above a threshold probability to calculate the one or more geometric properties.

13. The system of claim 10, wherein one of the geometric properties is a contour that encapsulates the perforation.

14. The system of claim 10, further comprising a ring-shaped phased-array of ultrasound transducers for capturing transverse image frames of the casing.

15. The system of claim 10, wherein the geometric properties calculated is a diameter or volume of the perforation.

16. The system of claim 10, wherein the ultrasound image comprises three-dimensional data.

17. The system of claim 10, wherein the Perforation Segmentation Model is a Semantic model.

18. The system of claim 10, the instructions further performing assembling a geometric model of the casing from the stored geometric properties of hundreds of perforations.

19. The system of claim 10, wherein the visualization corresponds to the received ultrasound image being overlaid by a plurality of contours that each encapsulate a respective perforation of a plurality of perforations, each contour being a 2D contour in coordinates of azimuth and axial position along the casing.

20. The method of claim 1, wherein the visualization corresponds to the received ultrasound image being overlaid by a plurality of contours that each encapsulate a respective perforation of a plurality of perforations, each contour being a 2D contour in coordinates of azimuth and axial position along the casing.

* * * * *